United States Patent [19]
Goulet et al.

[11] Patent Number: 4,885,015
[45] Date of Patent: Dec. 5, 1989

[54] HEPA AIR FILTER FOR HIGH TEMPERATURE ENVIRONMENTS AND METHOD OF FABRICATION

[75] Inventors: Roger Goulet, Jamestown, R.I.; Joseph Cutri, Syracuse; Joseph DeYulio, Baldwinsville, both of N.Y.

[73] Assignee: Cambridge Filter Corporation, Syracuse, N.Y.

[21] Appl. No.: 252,649

[22] Filed: Oct. 3, 1988

[51] Int. Cl.⁴ .................. B01D 27/06; B01D 27/08
[52] U.S. Cl. ........................... 55/497; 55/500; 55/502; 55/521; 55/DIG. 31; 156/227; 156/257; 156/292; 156/298; 428/120; 428/182; 428/184
[58] Field of Search ............... 55/497, 500, 502, 521, 55/DIG. 31; 156/227, 257, 292, 298; 210/493.1, 493.2; 428/119, 120, 182, 184

[56] References Cited
U.S. PATENT DOCUMENTS

| | | | |
|---|---|---|---|
| 2,884,091 | 4/1959 | Baldwin | 55/500 |
| 3,581,479 | 6/1971 | Goulet et al. | 55/500 X |
| 4,199,387 | 4/1980 | Hladik | 156/227 X |
| 4,227,953 | 10/1980 | Wasielewski et al. | 156/227 |
| 4,537,812 | 8/1985 | Elbers | 55/497 X |
| 4,600,419 | 7/1986 | Mattison | 55/502 X |
| 4,795,481 | 7/1989 | Ellis | 55/500 |

Primary Examiner—Robert A. Dawson
Attorney, Agent, or Firm—Charles S. McGuire

[57] ABSTRACT

An air filter unit of the HEPA type having a filter core of zig-zag folded media enclosed by a four-sided frame having two side casings and two end casings. Each end casing includes a recess extending into the inwardly facing surface thereof and bounded on all four sides by marginal edge portions of the end casing. The end flaps of the folded media are adhesively secured to the inwardly facing surfaces of the side casings and the recesses in the end casings are filled with an adhesive initially in a flowable state and hardenable to a solid state. The zig-zag edges of the folded media are disposed entirely within the adhesive, as are tenons extending from the ends of the side casings, thereby forming a mortise type joint between the side and end casings. A plurality of channels, preferably of dove tail cross section, extend across and communicate with the recesses in the end casings.

26 Claims, 3 Drawing Sheets

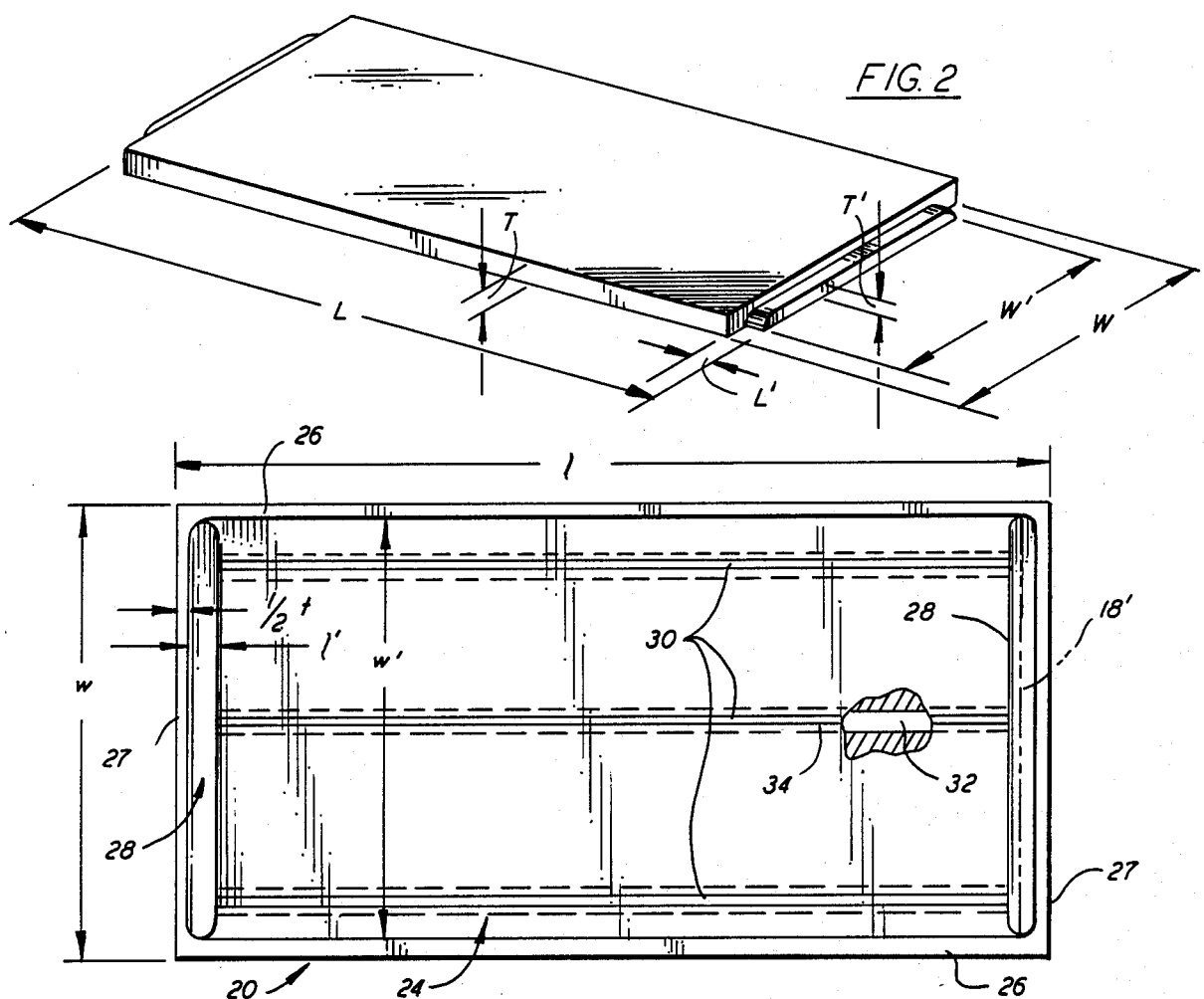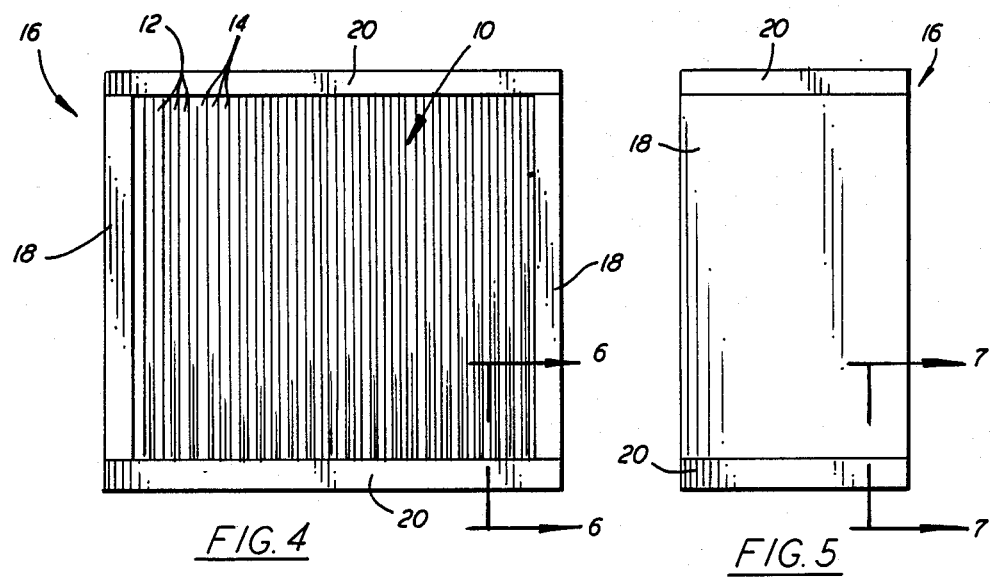

HEPA AIR FILTER FOR HIGH TEMPERATURE ENVIRONMENTS AND METHOD OF FABRICATION

BACKGROUND OF THE INVENTION

The present invention relates to high efficiency air filters, and more specifically to a filter core and frame assembly suitable for use in high temperature environments.

Air filters of the so-called HEPA type are required to operate with a minimum 99.97% efficiency in removing airborne particles. In a popular construction of such filters, a filter core is formed of a continuous sheet of filter media folded in zig-zag fashion to form a plurality of accordion pleats of uniform size with thin, corrugated, spacer sheets placed between the opposing walls of each pleat. The filter core is supported by a surrounding, box-like frame with which the media is sealingly engaged about its entire periphery, including both pleat ends and the entire length of both media edges. The integrity of the seal between filter core and frame is critical, of course, in preventing unfiltered air from bypassing the filter.

In some applications, air filters of this type are installed in locations where they are exposed to high temperatures, e.g., on the order of 1000° F. Problems which have been encountered with typical filter assemblies employed under such conditions include separation of and consequent air leakage between sealers and frame members, cracking of sealers, and powdering or crumbling of adhesive. These problems may be due both to the high temperatures and to poor structural strength of the filter assembly, resulting from dissimilar rates of thermal expansion, poor adhesion and low strength.

An early approach to the problem of providing the required sealing between the filter core and frame which is capable of withstanding high temperatures is that disclosed in U.S. Pat. No. 2,884,091 of Baldwin. In this construction, a resilient mat or blanket of fine glass fibers is compressed between the filter core and a surrounding metal frame. However, after prolonged exposure to temperature approaching 1000° F. the glass fibers begin to anneal, causing the mat to loose resiliency and eventually resulting in air leakage between the core and frame. Another filter construction intended for high temperature applications is that disclosed in U.S. Pat. No. 4,199,387 of Hladik, involving the application of a ceramic adhesive with a trowel to the zig-zag edges of the media and interposed spacer members.

Filter constructions and methods of assembly which include immersion of the zig-zag edges of the media in a liquid sealant which later hardens to form a seal between the media and frame are shown in U.S. Pat. No. 3,581,479 of Goulet, and 4,227,953 of Wasielewski and Hladik. In the former, a groove or channel is formed across the inner surfaces of the top and bottom frame members for insertion of an elongated nozzle through which a liquid adhesive is injected as the nozzle is withdrawn from the groove. The assembly method of the latter patent involves filling shallow pans with the liquid adhesive and immersing therein the zig-zag edges of the pleated media. The bottom members of the shallow pans become the ends of the filter casing, and side members are adhesively sealed to the end media pleats and attached to the end members of the casing.

The principal object of the present invention is to provide a HEPA air filter construction which retains its structural rigidity and filtering efficiency when exposed to high temperatures for relatively long time periods.

Another object is to provide a high efficiency air filter having improved means, effective at both normal and high temperatures, for maintaining an accordion pleated filter media in sealed engagement about its entire periphery with a surrounding frame.

A further object is to provide an air filter frame construction having improved features enhancing the ability of the frame to be placed and maintained in sealing engagement with a pleated filter core by means of a sealant initially in liquid form and hardenable to an air-impervious solid.

Other objects will in part be obvious and in part appear hereinafter.

SUMMARY OF THE INVENTION

The filter construction of the present invention includes a conventional core comprising a continuous, accordion pleated sheet of filter media with corrugated spacer members positioned between opposing walls of each pleat in both the upstream and downstream directions of air flow. The core is supported in and sealed to a surrounding frame including the usual side and end casing members which are maintained in assembled relation with one another, as well as with the filter core, by a high strength, high temperature adhesive. The members forming the frame are also suitable for high temperature applications, preferably comprising a calcium silicate board which is readily machined.

The end casing members are formed into a shallow, pan-like configuration by machining to provided a central recess bounded by relatively short side walls. The end casing members are further machined to a greater depth in areas extending across both ends of the recess and in a series of parallel grooves extending between and communicating with the deeper areas at each end of the recess. The grooves are of dovetail cross-section, being wider at the bottom than at the top.

The side casing members are machined to include a tenon extending from each end, dimensioned to fit within the deeper portions at each end of the recesses in the end casing members. The filter unit is assembled by adhesively sealing the outer surfaces of the media end pleats to inner surfaces of the two side casing members and filling the recess, including the deeper portions at each end and the dovetail grooves, with the sealant in liquid form. The zig-zag edges of media and edge portions of the interposed spacer members forming one end of the filter core are placed within the recess, and the tenons at the corresponding ends of the side casing members are inserted into the deeper areas at the ends of the recess. The sealant is then allowed to solidify, thereby encasing the end of the filter core and tenons, forming a mortise joint at each end between the end and side casing members.

The recess in the second end casing is filled with liquid sealant, and the previously assembled parts are inverted to insert the opposite end of the filter core and side casing tenons in the recess. Upon hardening of the sealant in the second end casing, assembly is complete.

BRIEF DESCRIPTION OF THE DRAWINGS

FIG. 2 is a perspective view of one of the side casings of the filter construction of FIG. 1;

FIG. 3 is a plan view of one of the end casings of the filter construction;

FIGS. 4 and 5 are front and side elevational views, respectively, of the fully assembled filter construction;

Detailed Description

Figure 1:
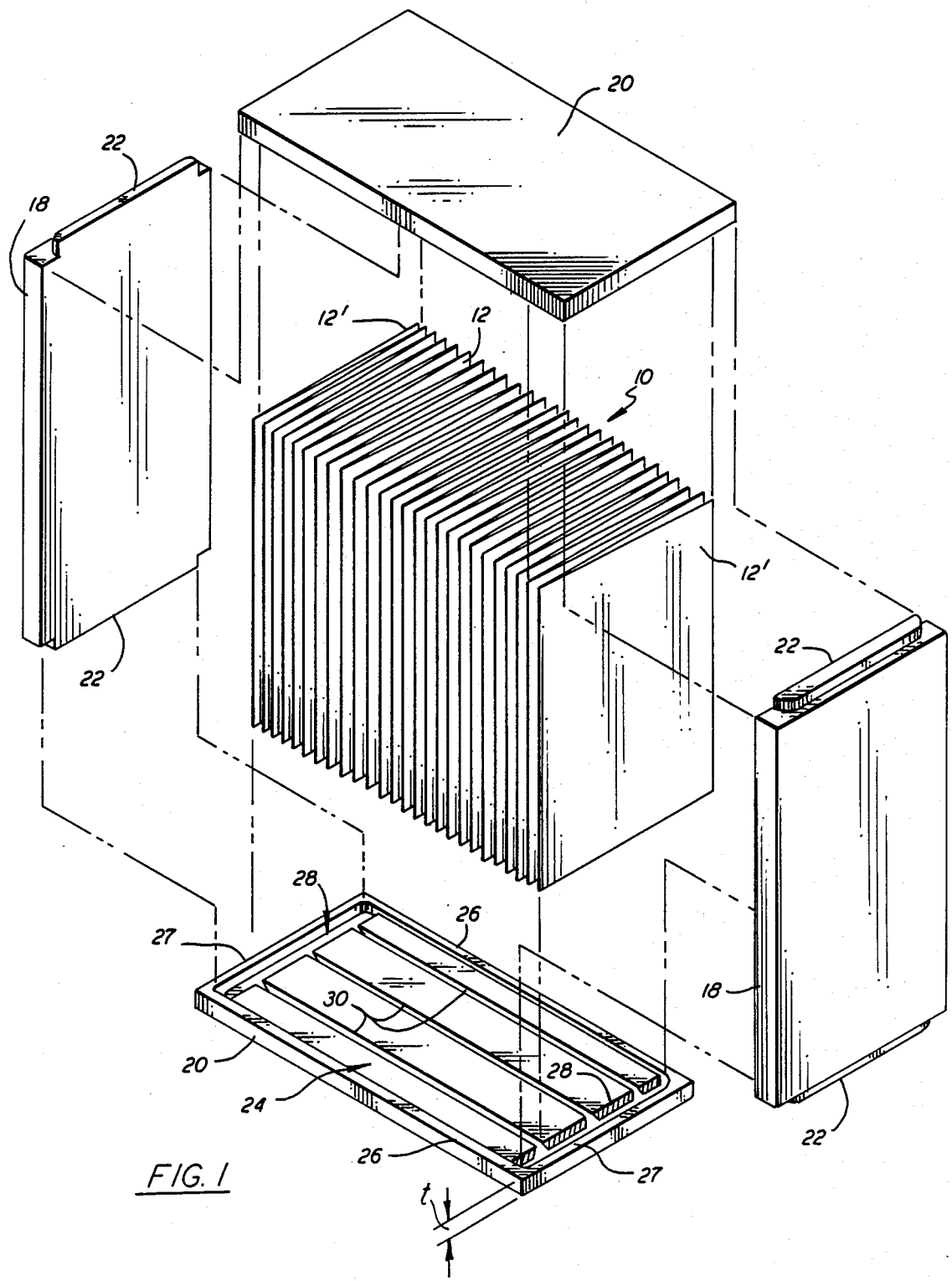
FIG. 1 is an exploded perspective view of the elements of the filter construction of the invention.

Referring now to the drawings, in FIG. 1 is shown a conventional type filter core, denoted generally by reference numeral 10, comprising a continuous sheet of filter media 12, folded in zig-zag fashion to form a plurality of accordion-type pleats of equal size, with a spacer member 14 positioned between the opposing walls of successive pleats. For greater clarity, the spacer members are not shown in FIG. 1, but may be seen in FIGS. 4 and 7. In the filter construction of the present invention, media 12 is preferably a fiberglass material and spacer members 14 are corrugated aluminum or stainless steel foil, both the materials and manner of fabrication of such filter cores being conventional.

Core 10 is surrounded on four sides by frame 16 made up of two identical side casing members 18 and two identical end casing members 20. All of casing members 18 and 20 are fabricated from material which is dimensionally stable and fireproof at temperatures up to, e.g., 1200° F. The material should also be readily machineable, as that is the preferred method of forming the casing members in the desired configurations. An example of such a material is the calcium silicate board produced by Johns Manville Corp. under the trademark "Marinite 1".

Figure 6:
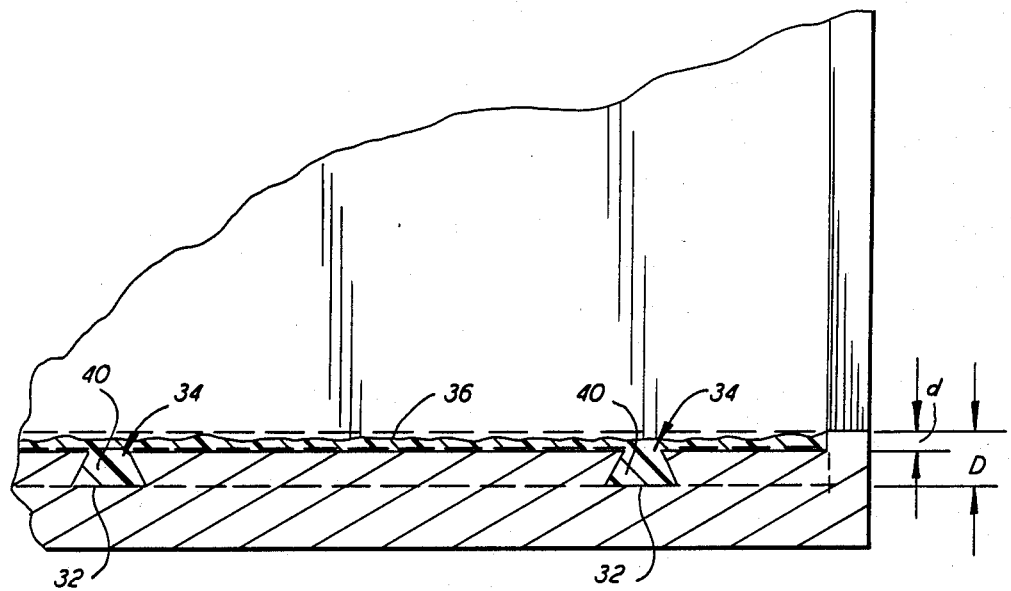
FIG. 6 is an enlarged fragmentary, elevational view in section on the line 6—6 of FIG. 4.
Figure 7:
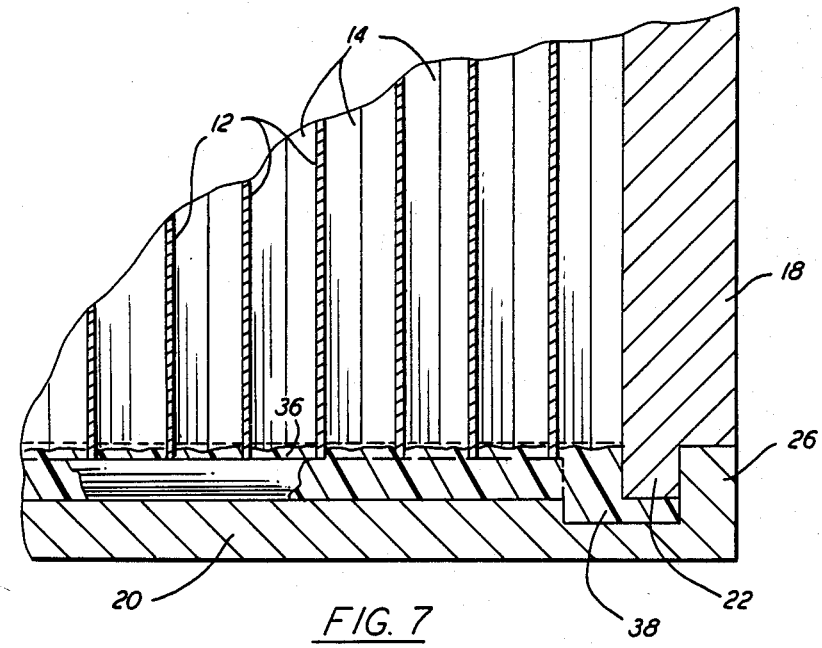
FIG. 7 is an enlarged fragmentary, elevational view in section on the line 7—7 of FIG. 5.

Referring now to FIGS. 2 and 3, side casing members 18 are formed rectangular pieces of stock having length L, width W and thickness T, machined to provide at each end a tenon 22 having a length L'; width W', and thickness T'. End casing members 20 are likewise formed from rectangular stock of length l, width w and thickness t (FIG. 1). Central recess 24, bounded by walls 26 and 27 on the sides and ends, respectively, is machined into one major surface of each of members 20 to a depth d (FIG. 6). End casing members 20 are further machined within recess 24 to provide areas 28 extending across both ends of the recess, and a plurality of parallel grooves 30 extending between and communicating at opposite ends with areas 28. Grooves 30 are machined to depth D, preferably at least twice depth d of recess 24, and areas 28 are machined to depth D', greater than depth D, as seen in FIG. 7. It will be noted that grooves 30 are wider at their bottom surfaces 32 than at their open tops 34, through which each of the grooves communicates directly with recess 24. Also, the portions lying between grooves 30 are beveled on the ends bordering areas 28 to provide surfaces 35, sloping inwardly at an angle of about 30°.

In assembling the elements of core 10 and frame 16, the outer surface of the flap or pleat 12' of media 12 at each side of the core is adhesively secured in airtight engagement with the corresponding inner surface of side casing members 18. The height of core 10 is equal to the length L of side casing members 18, plus the depths and of the central recesses 24 of the two end casings 20, as best seen in FIG. 7.

Recess 24, including areas 28 and grooves 30, of one of end casing members 20 is filled substantially to the height of walls 26 and 27 with a hardenable adhesive material in liquid or slurry form, which may be the same adhesive used to seal end pleats 12' to side casings 18, preferably a high strength, high temperature, inorganic, sodium silicate based adhesive such as that sold by Sauereisen Co. of Pittsburgh, Pennsylvania and designated as their adhesive #360. Such an adhesive is highly viscous, even in its "flowable" state, having a consistency similar to that of wet mortar. The zig-zag edges of media 12 on one side of core 10 are then immersed in the adhesive within recess 24, as are tenons 22 at one end of each of side casings 18, the tenons extending into areas 28 to form a mortise-type joint between the side and end casings. Sloping surfaces 35 allow the adhesive to flow more readily away from the joint as the side and end casings are joined.

Preferred relative dimensions of side and end casings 18 and 20 are such that the end surfaces of the side casings adjacent the tenons seat upon end walls 27 of the end casings with the tenons contacting the inside surface of the adjacent end walls. The widths of the side and end casings are equal (W=w), as are the widths of tenons 22 and areas 28 (W'=w'). Also, the thicknesses of the side and end casings are equal (T=t), and the thickness of the tenons is one-half the casing thickness (T'=½T). This is also the corresponding dimension of end walls 27, indicated as ½t in FIG. 3. The radius on one side at each end of tenons 22 is equal to the radius at the ends of areas 28, and the length of tenons 22 (L') is less than the depth of areas 28 (L'<D'). Thus, tenons 22 do not extend completely to the lower surfaces of areas 28, as seen in FIG. 7, and occupy somewhat more than one-half of the plan view area thereof.

After the adhesive has cured or hardened sufficiently that it will not flow out of end casing 20, recess 24 of the second end casing 20, including grooves 30 and areas 28, is likewise filled with the same liquid adhesive substantially to the height of walls 26 and 27. The assembly of filter core 10, side casings 18 and one of end casings 20 with the hardened adhesive therein is inverted and the opposite zig-zag edges of media 12 and adjacent tenons 22 of side casings 18 are immersed in the adhesive within the second end casing 20. It is also preferred that a strip or bead of the adhesive be applied along each lateral edge, where the end flaps of the media meet the side casings, after assembly is otherwise complete. Such beads are preferably applied at the downstream face of the unit and are indicated by the heavy lines denoted by reference numeral 37 in FIG. 4. The bead preferably extends to and may encompass the edge of the outermost corrugated space element at each side of the filter unit. When the adhesive has cured, assembly is complete and the filter unit is ready for use.

The adhesive within end casings 20 may be seen in FIGS. 6 and 7, the portion with recess 24 in which the edges of media 12 are embedded being denoted by reference numeral 36, and the portions within areas 28 and grooves 30 by numerals 38 and 40, respectively. Although different reference numerals are used to denote different portions of the adhesive, it will be understood, of course, that all of the adhesive within each of end casings 20 forms a continuous mass since grooves 30 communicate through their open sides 34 with recess 24, and at each end with areas 28, the latter also being contiguous with recess 24.

The lengths of casings 18 and 20 (L and l) may be in any desired relationship to define either a square or rectangular air flow opening, and the casing widths, although equal to one another, may be varied to provide filter units of various depths. For example, in a nominal 24"×24"×12" filter unit, typical dimensions would be L=23.188", l=23.938" and W=w=11.5". In a nominal 12"×12"×6" unit, typical dimensions would be L=11.188", l=11.938" and W=w=6". Other dimensions may be constant regardless of the nominal outside dimensions of the filter unit, examples of which are: T=t=1'=0.750", T'=L'=½t=0.375", W'=w'=W−0.876 (0.438 each side), d=0.188, and D=0.438; the radius at each end of areas 28, and that on one side at each end of tenons 22 is 0.375; the width of dove-tail grooves 30 is 0.375" at the open, upper sides and 0.500" at the lower side; and, the width of walls 27=½t'=0.375" and walls 26=0.250". The outer grooves 30 are spaced 1.5" (on centers) inwardly of the outside edges of end casings 20 parallel to the grooves, and the third groove is mid-way between these edges, and thus between the two outer grooves.

The dove-tail grooves lock the adhesive to the end casings, and the mortise-type connections provide a structurally strong and stable joint at the four corners, resulting in a very rigid filter assembly. The grooved pan design also allows the filter core to be assembled by a potting technique wherein the cut or trimmed (zig-zag) edges of the media are completely immersed, and thereby encapsulated, in the adhesive. The structure requires no additional fasteners or braces to maintain its structural stability and integrity. The mortise-type joint is not continuous through the width of the casing members between the upstream and downstream faces of the finished filter assembly, thereby avoiding a potential leak path in the event of cracks in the adhesive or between the adhesive and casing members.

What is claimed is:

1. An air filter assembly comprising:
   (a) a filter core including a unitary sheet of air-permeable media folded in accordion fashion to form a plurality of side-by-side pleats with zig-zag edges on two opposite sides and flat panels on the other two sides, and a spacer member between opposing walls of successive pleats; and
   (b) a box-like frame enclosing said media on four sides in air tight engagement to define an air flow opening extending between upstream and downstream sides on said assembly, said frame comprising:
      (i) an essentially identical pair of substantially rectangular sides casings, each having a length L, a width W and a thickness T;
      (ii) a tenon at each end of said side casings, each of said tenons having a length L', a width W' and a thickness T';
      (iii) an essentially identical pair of substantially rectangular end casings, each having a length l, a width w and a thickness t;
      (iv) a recess formed in one major surface of each of said end casings inwardly of the peripheral edges thereof, said recess extending into said major surface to a substantially uniform depth d and being bounded on each side by walls comprising marginal edge portions of the end casing in which it is formed and on each end by an area extending into said major surface to a substantially uniform depth D' from said major surface, depth D' being greater than depth d; and
      (v) a plurality of grooves having upper sides communicating with said recess and lower sides at a substantially uniform depth D from said major surface, depth D being greater than depth d, said grooves communicating at each end with said areas; and
   (c) means sealing outwardly facing surfaces of said media panels to opposing, inwardly facing surfaces of said side casings in airtight engagement, said zig-zag media edges being positioned in said recesses and said tenons on said side casings being positioned in said areas at opposite ends of said recesses, thereby forming a mortise-type joint between said side and end casings; and
   (d) a solid adhesive material within each of said recesses, areas and grooves of said end casings, whereby said zig-zag media edges and said tenons are encased in said adhesive material.

2. The air filter assembly of claim 1 wherein said adhesive material is a high strength, high temperature, sodium silicate based adhesive.

3. The air filter assembly of claim 2 wherein said end casings and said side casings are fabricated from calcium silicate board.

4. The air filter assembly of claim 1 wherein depth D is at least twice as great as depth d.

5. The air filter assembly of claim 4 wherein said grooves are parallel to one another and to the side edges of said end casings.

6. The air filter assembly of claim 5 wherein said grooves have a width at said upper sides thereof which is less than the width at said lower sides thereof, said grooves thereby being of dovetail cross section.

7. The air filter assembly of claim 6 wherein depth D' is greater than depth D.

8. The air filter assembly of claim 7 wherein length L' is greater than depth d and less than depth D.

9. An air filter assembly comprising:
   (a) a filter core including a unitary sheet of air-permeable media folded in accordion fashion to form a plurality of side-by-side pleats with zig-zag edges on two opposite sides and flat panels on the other two sides, and a spacer member between opposing walls of successive pleats; and
   (b) a box-like frame enclosing said media on four sides in air tight engagement to define an air flow opening extending between upstream and downstream sides of said assembly, said frame comprising:
      (i) an essentially identical pair of rectangular side casings having inwardly facing surfaces adhesively sealed in air-tight engagement with opposed, outwardly facing surfaces of said flat panels;
      (ii) an essentially identical pair of rectangular end casings of substantially the same width as said side casings and positioned in perpendicular, end-to-end relationship therewith to form said box-like frame;
      (iii) a recess formed in the inwardly facing surface of each of said end casings, said zig-zag edges of said media being positioned entirely within said recesses;
      (iv) a tenon extending from both ends of each of said side casings into said recesses to form a mortise-type joint between adjoining ends of said side and end casings said recesses being bounded on all four sides by marginal edge portions of said end casings, whereby said mortise-type joints do not extend continuously through said side and end casings between said upstream and downstream sides of said assembly.

(c) a solid adhesive material at least partially filling each of said recesses, said zig-zag media edges and said tenons being completely embedded in said adhesive material.

10. The air filter assembly of claim 9 wherein said recesses include a central portion wherein said zig-zag media edges are entirely disposed, and areas at each end of said central portion wherein said tenons are disposed.

11. The air filter assembly of claim 10 wherein said areas extend into said inwardly facing surfaces of said end casings to a greater depth than said central portion.

12. The air filter assembly of claim 11 wherein said zig-zag media edges extend into said central portion of said recess to substantially the full depth thereof.

13. The air filter assembly of claim 12 wherein said tenons extend into said areas to substantially less than the full depth thereof.

14. The air filter assembly of claim 11 and further including at least one groove extending into each of said inwardly facing surfaces of said end casings to a greater depth than said recesses, said grooves communicating along one side with said recesses and at opposite ends with said areas.

15. The air filter assembly of claim 14 wherein said areas extend into said inwardly facing surfaces of said end casings to a greater depth than said grooves.

16. The air filter assembly of claim 15 wherein said grooves are of dove-tail configuration, being of lesser width along said one side than along the other side.

17. The air filter assembly of claim 16 wherein a plurality of said grooves extend into each of said inwardly facing surfaces of said end casings, spaced from and parallel to one another and to opposite side edges of said end casings.

18. The air filter assembly of claim 17 wherein all of said grooves are of equal, constant cross section throughout their lengths.

19. The method of fabricating an air filter assembly comprising:

(a) folding a unitary sheet of filter media in accordion fashion to provide a plurality of side-by-side pleats with zig-zag edges lying in common planes on opposite ends and flat panels on opposite sides;

(b) forming a pair of substantially identical, rectangular side casings having a tenon of lesser width and thickness than said side casings extending outwardly from each end thereof;

(c) forming a pair of substantially identical, rectangular end casings having a width equal to the width of said side casings and a recess extending into a major surface thereof, said recess being bounded on each side and end by marginal side wall portions of said end casings;

(d) adhesively securing said flat panels to opposing surfaces of said side casings in airtight engagement;

(e) substantially filling said recess of one of said end casings with a quantity of adhesive in a flowable state, hardenable to a solid state;

(f) placing said side casings in end-to-end relation with said one end casing, at 90° thereto, with said tenon at one end of each of said side casings and said zig-zag edge on one end of said media fully immersed in said adhesive;

(g) allowing said adhesive in said one end casing to harden sufficiently that it is essentially non-flowable;

(h) substantially filling said recess in the other of said end casings with a quantity of said liquid adhesive;

(i) inverting said filter media, side casings and one end casing, and placing said side casings in end-to-end relation with said other end casing, at 90° thereto, with said tenon at the other end of each of said side casings and said zig-zag edge on the other end of said media fully immersed in said adhesive; and (j) allowing said adhesive in both of said end casings to harden to a solid state.

20. The method of claim 19 and including the further step of placing a corrugated spacer member between opposing surfaces of each successive pleat of said media prior to securing said flat panels to said side casings.

21. The method of claim 20 wherein said recess in each of said end casings includes a central portion extending into said major surface to a predetermined depth, and areas of greater depth than said predetermined depth at each end of said central portion for the full width thereof, and wherein said tenons are placed in said areas and said media zig-zag edges are placed in said central portion between said areas.

22. The method of claim 21 and including the further step of forming at least one groove within said recess of each of said end casings, said groove having one side communicating with said central portion and opposite ends communicating with said areas at opposite ends of said central portion.

23. The method of claim 22 wherein said groove is of uniform, dove-tail cross section along its entire length.

24. The method of claim 23 wherein said groove is parallel to opposite side edges of said end casings.

25. The method of claim 19 and including the further step of placing a bead of said adhesive along each side of said filter assembly in the areas where said flat panels meet said side casings and extending between said end casings, on at least one side of said assembly.

26. The method of claim 25 wherein said bead is applied along each side of said filter assembly only on the downstream side thereof.

* * * * *